United States Patent [19]
Griffioen et al.

[11] Patent Number: 5,946,788
[45] Date of Patent: Sep. 7, 1999

[54] METHOD AND DEVICE FOR INSERTING A CABLE-SHAPED MEMBER INTO AN ELONGATED, TUBULAR SHEATHING WOUND AROUND, OR IN, A HOLDER

[75] Inventors: Willem Griffioen, Ter Aar, Netherlands; Gerard Plumettaz, Bex, Switzerland

[73] Assignee: Koninklijke KPN N.V., Groningen, Netherlands

[21] Appl. No.: 08/985,091

[22] Filed: Dec. 4, 1997

[30] Foreign Application Priority Data

Dec. 11, 1996 [NL] Netherlands .......... 1004747

[51] Int. Cl.$^6$ .............. B23P 19/04; B66F 3/24; G02B 6/44
[52] U.S. Cl. ............... 29/433; 29/241; 29/819; 29/821; 254/134.4; 254/134.3 FT; 242/54 R; 385/134
[58] Field of Search ........... 29/821, 868, 241, 29/728, 819, 433; 254/134.4, 134.3 FT, 134.3 R; 385/100, 103, 134

[56] References Cited

U.S. PATENT DOCUMENTS

| | | |
|---|---|---|
| 3,778,878 | 12/1973 | Bindari . |
| 3,840,972 | 10/1974 | El Bindari . |
| 4,266,709 | 5/1981 | Kruger . |
| 4,332,436 | 6/1982 | Adorni et al. . |
| 4,793,048 | 12/1988 | Kashiwaya et al. . |
| 4,802,270 | 2/1989 | Kashiwaya et al. . |
| 4,850,569 | 7/1989 | Griffioen et al. . |
| 4,887,354 | 12/1989 | Van Der Maaden . |
| 4,934,662 | 6/1990 | Griffioen et al. . |
| 4,953,827 | 9/1990 | Araki et al. . |
| 5,011,332 | 4/1991 | Kunze et al. . |
| 5,046,674 | 9/1991 | Kolschbach et al. . |
| 5,048,798 | 9/1991 | Araki et al. . |
| 5,058,259 | 10/1991 | Araki et al. . |
| 5,118,226 | 6/1992 | Horii et al. . |
| 5,181,668 | 1/1993 | Tsuji et al. . |
| 5,245,740 | 9/1993 | Araki et al. . |
| 5,429,194 | 7/1995 | Nice . |
| 5,503,370 | 4/1996 | Newman et al. . |
| 5,573,225 | 11/1996 | Boyle et al. . |
| 5,599,004 | 2/1997 | Newman et al. . |
| 5,699,996 | 12/1997 | Boyle et al. . |

FOREIGN PATENT DOCUMENTS

| | | |
|---|---|---|
| 0 091 717 | 10/1983 | European Pat. Off. . |
| 0 279 006 | 8/1988 | European Pat. Off. . |
| 0 334 359 | 9/1989 | European Pat. Off. . |
| 0 354 295 | 2/1990 | European Pat. Off. . |
| 1-65516 | 3/1989 | Japan . |
| 1-65517 | 3/1989 | Japan . |
| 2-48605 | 2/1990 | Japan . |
| 2 157 019 | 10/1985 | United Kingdom . |

OTHER PUBLICATIONS

Patent Abstracts of Japan, vol. 18, No. 557, JP–6201960, Jul. 1994.

*Primary Examiner*—David P. Bryant
*Assistant Examiner*—John Preta
*Attorney, Agent, or Firm*—Frishauf, Holtz, Goodman, Langer & Chick, P.C.

[57] ABSTRACT

A cable (5) is inserted, by way of a free end (2.1), into a tube (2) wound around a tube reel (1) which is fixed, with its winding axis (y) vertical, onto a carrier (7). The carrier with the tube reel is subjected to a periodical movement having a vertical component and a longitudinal component. The vertical component is a vertical oscillation having a period (P) and an amplitude ($A_v = gP^2/32$) for an, at any rate approximately, "free-fall" movement during part of each period, preferably during half a period. The longitudinal component is an oscillating rotation around the vertical winding axis of the tube reel having the same period (P) and an amplitude ($A_L$). The "free-fall" movement is preferably commenced when the rotational direction of the oscillating rotation is reversed and becomes backward, as opposed to the insertion direction of the cable.

28 Claims, 9 Drawing Sheets

(a)

(b)

METHOD AND DEVICE FOR INSERTING A CABLE-SHAPED MEMBER INTO AN ELONGATED, TUBULAR SHEATHING WOUND AROUND, OR IN, A HOLDER

BACKGROUND OF THE INVENTION

1. Field of the Invention

The invention lies in the area of the manufacture of cable-shaped members in tubular sheathings. More particularly, the invention relates to a method for inserting a cable-shaped member into an elongated, tubular sheathing which is wound in, or around, a holder, with the holder being subjected to a periodical movement having a vertical component and a longitudinal component aligned with the longitudinal direction of the wound tube, and a device for carrying out the method.

2. Prior Art

In most cases, cables are preferably installed in tubes, inter alia due to the protective effect of a tube and the option of later replacing the cable in a simple manner. If it is possible to insert the cable into the tube in advance (prefab), such often is cheaper than installation in the field. To have this cost advantage actually apply, there must be a simple method of already inserting a cable into a tube at the time of manufacture. Extrusion of the tube around the cable is a simple method per se, but it is difficult to prevent the cable from sticking to the tube, particularly in the event of a close-fitting tube. At the insertion of a cable into a finished tube, it may be of great advantage to already have the tube in a state, e.g., on a reel, in which it may be delivered after insertion of the cable. Methods for inserting a cable in wound state into a tube are known per se. A type of method makes use here of the entraining effect of a fluid flowing, with a relatively high velocity, along a cable to be entrained in a tube. Known here are the application of a fluid, as described in U.S. Pat. No. 4,332,436, and a gaseous medium, such as compressed air, which is disclosed in GB-A-2157019. In the event of tubes in a wound state, in general only relatively limited insertion lengths are capable of being realized with this method.

A second type of insertion method is disclosed, e.g., in EP-A-0091717 and EP-A-0279006. According to the technique disclosed in said references, a reel around which a tube is wound is subjected, with its axis in vertical position, to a periodical movement in which the tube after each period returns to a same initial position. According to EP-A-0091717, the cable moves through the tube, in this case a bore or a channel in a carrier member such as a ribbon, as a result of the periodical movement and its mass inertia. As periodical movements there are named vibrating movements, possibly in combination with a pulsating or shaking movement. The preferably harmonically vibrating movement has a relatively small angle of inclination with respect to the longitudinal direction of the tube. In EP-A-0279006 a similar technique is described, in which the periodical movement is a helical vibration, i.e., a spiral movement having a small vertical component and a larger longitudinal component in the longitudinal direction of the tube. According to both variants of the insertion technique of the second type, the cable is vibrated forward, as it were, along the curved path of the tube on the reel. In this connection, the longitudinal component of the vibration provides a small propelling force, while at the same time the vertical component provides a short-lived reduction of the friction between the cable and the inner surface of the tube. Said insertion technique has the great advantage that basically it does not depend on the cable or tube length. The vibrations, however, evidently require relatively high frequencies and relatively small amplitudes. In order to achieve that such vibrations are well capable of being transmitted from the reel to the tube, it is required that the tube is wound around the reel in a well-fixed manner, to which purpose there are mentioned special techniques. This is rather laborious in a production environment. An added restriction is that acceptable insertion velocities are evidently obtained only if the tube fits relatively loosely around the cable (diameter ratio of two and over).

In JP-A-06201960, there is disclosed yet another insertion technique, which to a certain extent may be considered a combination of the two types of insertion method described. According to said insertion technique, a cable-shaped member, such as an optical fibre or an electric wire, is inserted by way of a free end of a tube, which tube is wound around two capstan-like holders placed at a distance from one another. In this connection, suction is applied at the other end of the tube, while the curved parts of the tube are vibrated at the holders. The vibrations serve to cause a local reduction of the friction in the curved parts between the inner wall of the tube and the cable. The vibrations are orientated vertically, with the suction effect having to provide the forward force on the cable. Said insertion technique roughly has the drawbacks of both types of insertion technique discussed above.

SUMMARY OF THE INVENTION

The object of the invention is to provide a method and a device for inserting a cable-shaped member into a tubular sheathing, which do not possess the drawbacks of the known techniques described above. For this purpose it offers an insertion technique of the second type referred to above, in which a specific periodical movement is applied. Said specific movement has a vertical component with, during a non-negligible part of the period, the tubular sheathing being subjected to an, at any rate approximately, "free-fall" movement. The underlying considerations here are that a first body, contained within a hollow second body, does not exercise forces on the inner wall of the second body during a free fall of both bodies. This means that the first body is in a floating state, as it were, with respect to the second body. Applied to a tube in rolled-up state, a cable in the tube will be in such a floating state over its entire length during such a "free-fall" movement, and therefore in said state will basically be capable of frictionless forward movement through the tube. In addition, if a longitudinal component of the periodical movement, which is aligned with the longitudinal direction of the tube, provides an initial velocity in the insertion direction, at the beginning of the "free-fall" movement in each period, the cable, during part of each period in which the "free fall" takes place, will float/glide forward in the tube (substantially) without friction, and in this manner will be inserted into the tube over the available length.

EP-A-0334359 discloses an improvement of the method and apparatus described in EP-A-0279006, which implies a solution for the problem that during the periodical movement of the reel a movement of the inlet end of the tube may disturbe the insertion of a cable-shaped member into the tube. In one embodiment this solution implies a specific guiding piece connected to the inlet end of the tube, and in which the cable-shaped member is falling under gravity. In preferred embodiments of the method and device of, the present invention different and simpler solution for this problem is achieved.

Further preferred embodiments for the method and the device are summarized in further subclaims.

According to the present invention, not only are the need of a tube well-fixed to a reel and the need of a relatively large diameter ratio of tube and cable avoided, but in addition much higher insertion velocities are made possible than with the known techniques.

INCORPORATION BY REFERENCE

The entire contents of all mentioned hereinabove, including U.S. Pat. No. 4,332,436, GB-A-2157019, EP-A-0091717, EP-A-0279006, JP-A-06201960, and EP-A-0334359, are incorporated in the present application by reference.

BRIEF DESCRIPTION OF THE DRAWINGS

The invention will be further explained by means of a description of exemplary embodiments, with reference being made to the following figures.

DETAILED DESCRIPTION

First it should be noted that the method to be described is basically applicable for inserting any cable-shaped member, such as a cable, an optical fibre, a wire, or even a cord, into any elongated hollow body, such as a tubular body or a body provided with a bore or a channel, which during the insertion may guide the cable-shaped member in the insertion direction, and after the insertion may offer the inserted member a protection. For briefness' sake, hereinafter such a cable-like member and such an elongated hollow body will be referred to as cable and tube, respectively.

The method to be described is generally applicable to a tube which is in a wound state around, or in, a holder, i.e., having substantially spiral turns around a common (vertical) axis. The holder may be a container in which the tube is stored in such a manner. In the embodiment presented of the method, the tube in which the cable is inserted is wound around a reel only by way of example. An essential element of the method is that the reel, for the benefit of, and during, the insertion of the cable into the tube, is subjected, together with the tube, to a periodical movement having specific vertical and longitudinal components.

Figure 1:
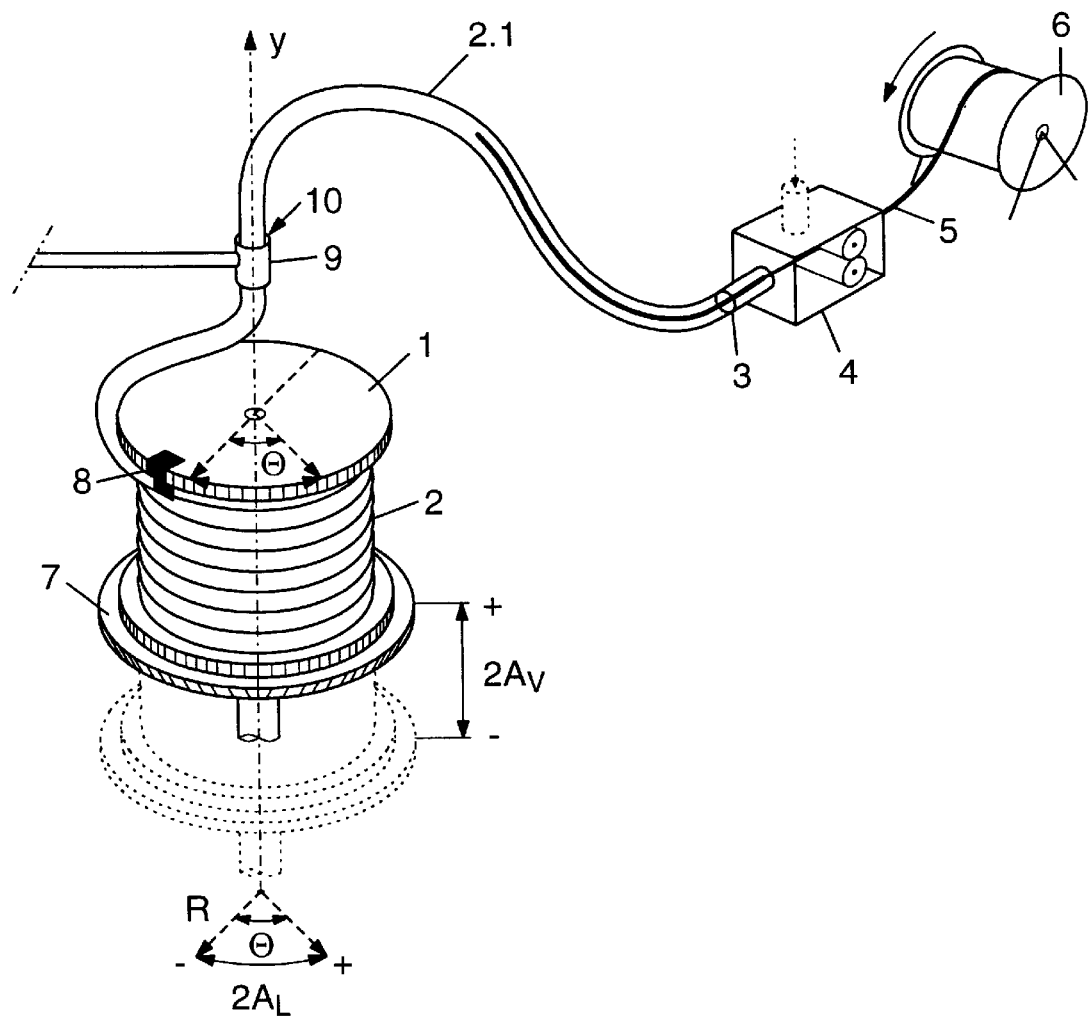
FIG. 1 diagrammatically shows an embodiment of the method according to the invention in elementary form.

In its most elementary form, the method is described with reference to FIG. 1. FIG. 1 shows a tube reel 1 around which a tube 2 is wound, depending on the length and the diameter of the tube and the diameter of the reel, in one or more layers. A free end 2.1 of the tube is coupled, possibly by way of a suitable coupling device, to a cable-feed unit 4. A cable 5 is supplied from a cable reel 6 and inserted, by the cable-feed unit 5, into the free end 2.1 of the tube 2. The tube reel 1 is detachably mounted, with its central axis substantially vertical (y axis), on a carrier platform, hereinafter referred to as carrier 7. The carrier 7 may be driven by drive means (not shown in FIG. 1; see the description below with respect to FIG. 5 et seq.) to carry out a periodical movement. The periodical movement has a periodical vertical component and a periodical longitudinal component. The vertical component is an up-and-down movement between two farthest vertical positions at a mutual distance $2A_V$. The longitudinal component is a reciprocating rotating movement between two farthest angular positions, over an angle $\Theta$ around the vertical axis. To start the insertion method, some length of cable is first inserted into the tube, e.g. manually, by way of the end 2.1 into one of more turns of the tube 2 around the reel. Then, the carrier 7 having the tube reel 1 thereon is subjected to the periodical movement. Clamping means 8 prevent the tube 2 from coming loose from the tube reel 1 during the movement. Between the clamping means 8 on the tube reel 1 and the feed unit 4, the tube is guided through a tube guide 9 connected to terra firma having a cylinder or eye-shaped passage opening 10. The passage opening 10, which is preferably located above the tube reel 1 and is coaxially orientated to the central axis (y axis) of the tube reel, serves to reduce the effects of the periodical movement of the tube reel on the free end 2.1 of the tube. In this connection, the longitudinal movement is converted into a rotating movement. To be capable of having the free end twist sufficiently, the free end 2.1 of the tube is coupled, possibly by means of a rotating tube coupling 3, to the feed unit 4.

Hereinafter, the vertical component and the longitudinal component of the periodical movement are referred to as vertical oscillation and oscillating rotation, respectively. The vertical oscillation and the oscillating rotation have the same period. Within each period, the vertical oscillation (along the indicated y axis) is alternatingly orientated upward and downward, i.e., opposed to, and in the direction of, the gravitational effect, respectively; and the oscillating rotation (around the indicated y axis) has a rotational direction which is alternatingly orientated to and fro, i.e., in, and opposed to, the insertion direction of the cable into the tube.

The vertical oscillation of the carrier 7 and, together with the carrier 7, the tube reel with the tube into which the cable is inserted, is such that this is tuned as well as possible to the gravitational force. That is to say that, within each period of the vertical oscillation, a "free-fall" movement is carried out during a first part of, e.g., half, the period. Only then does the part of the cable which has already been inserted into the tube, come loose from the inner surface of the tube for a non-negligible period of time. During a second part, the remainder of the period, the carrier, tube reel and tube are returned to a same initial position for the "free-fall" movement, and the cable in the tube is in frictional contact with the tube. During the "free-fall" movement, the cable is not in frictional contact, and will therefore basically be capable of moving forward in the tube without friction. In this connection, the oscillating rotation is tuned, as to phase and amplitude, to the "free-fall" movement in order to achieve the forward movement. The tuning preferably is such that the rotational direction of the oscillating rotation is (at any rate substantially) forward if the cable is in frictional contact with the tube, and (at any rate substantially) backward during the "free-fall" movement. The following calculations should support the choice of said preferred embodiment for the periodical movement. The calculations were carried out for a tube wound around the tube reel in one layer. For more than one layer, corrections are required.

A "free-fall" movement to which the tube reel is subjected in vertical direction (y axis) during half a period P, in its most ideal form may be described, as a function of the time t, by:

$$y = A_v - \tfrac{1}{2}g(t-P/4)^2 \text{ (for } 0 \leq t \leq \tfrac{1}{2}P). \tag{1}$$

For the second half of the period P, there may be chosen the same period mirrored with respect to y=0:

$$y = -A_v + \tfrac{1}{2}g(t-3P/4)^2 \text{ (for } \tfrac{1}{2}P \leq t \leq P) \tag{2}$$

A vertical oscillation described in this manner for each period has an amplitude $A_v$ which is given by:

$$A_v = gP^2/32, \tag{3}$$

where g expresses the acceleration of the gravitation.

Figure 2:
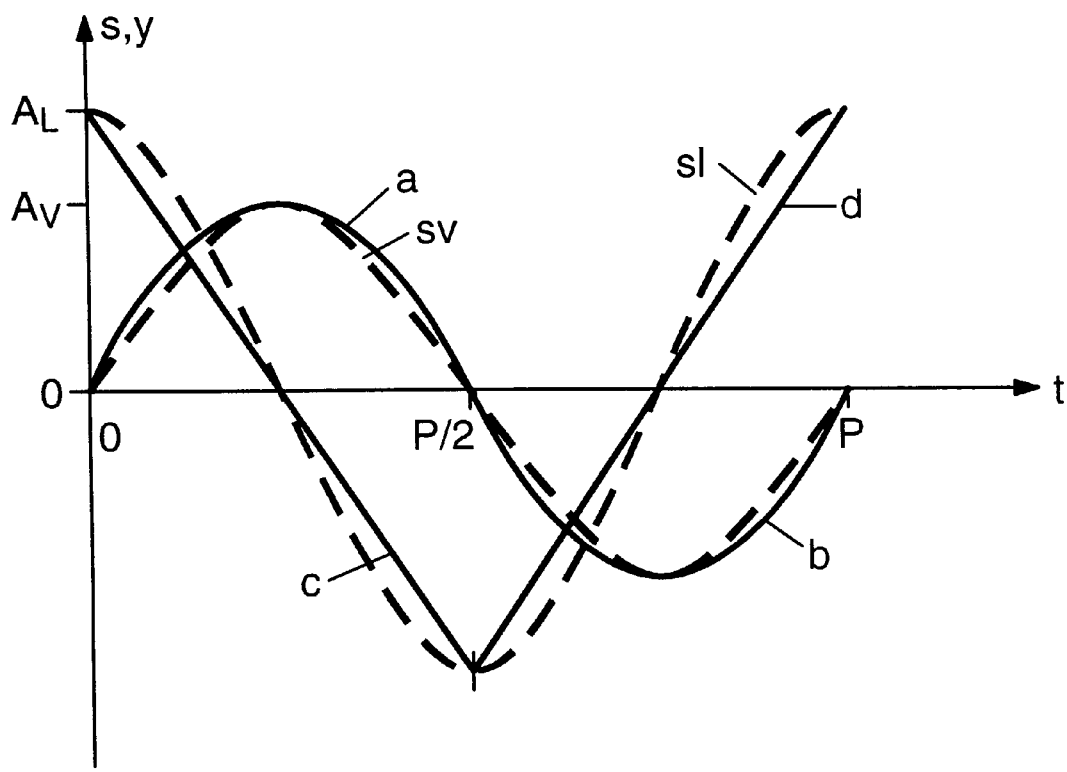
FIG. 2 gives a graphical representation of a vertical and a longitudinal component of a periodical movement applied in the embodiment of FIG. 1.

In FIG. 2, there is shown a period of the vertical oscillation as a function of t, viz., curve a according to equation (1) in the first half period and curve b according to equation (2) in the second half period. The cable in the tube on the tube reel in the first half period will basically be weightless with respect to the tube, while the cable in the second half period is in frictional contact under a double gravitational effect.

For the simultaneously oscillating rotation around the y axis, there was chosen a sawtooth-shaped movement having constant velocity $\pm v_t$ for the tube on the rotating tube reel. The phase of the sawtooth-shaped movement is chosen such that the velocity, and therefore also the rotational direction, changes sign at t=0 (from +, i.e., forward, to −, i.e., backward) and at t=½P (from − to +). With respect to a middle position, indicated by s=0, any point Q, which is located at a distance R from the central axis of the tube reel 1 on the tube 2, in a first half period covers a path s in time which may be described by:

$$s = A_L - v_t t \text{ (for } 0 \leq t \leq \tfrac{1}{2}P) \tag{4}$$

and $$s = -A_L + v_t(t-P/2) \text{ (for } \tfrac{1}{2}P \leq t \leq P) \tag{5}$$

and in which $A_L$ the amplitude of the oscillating rotation, is given by:

$$A_L = V_t P/4. \tag{6}$$

For comparison's sake, the path s was also graphically plotted out in FIG. 2, viz., line segment c for the first half period and line segment d for the second half period. In this connection, the vertical axis was used doubly, indicated by s,y. For t=0 and t=P, the oscillating rotation has its greatest deflection in the forward rotational direction, viz., s=$A_L$, while the greatest deflection in the backward rotational direction, viz., s=$-A_L$, occurs for t=½P. The graph shows how the two movements differ a quarter period in phase, namely as follows. If the cable in the tube experiences the double gravitational effect in the second half period (curve b) and therefore has a strong frictional contact with the tube, the rotational direction will be forward (line segment d). The cable and the tube will then have, at any rate in the greater part of the half period, the same absolute velocity $+v_t$. If, at the point in time t=½p, the cable has a relative velocity with respect to the tube, said velocity, due to the double gravitational effect, will then rapidly fall to zero in the second half period. If the cable in the tube has no frictional contact with the tube as a result of the "free-fall" movement in the first half period (curve a), the rotational direction will be backward (line segment c). If at the point in time t=P (i.e., t=0) the rotational direction of the tube reel having the tube thereon suddenly reverses its direction and becomes backward, at the beginning of the "free-fall" movement the cable with respect to the tube will have a forward-orientated initial velocity $2v_t$ (and vt with respect to terra firma). During the movement of the cable at velocity v (with respect to terra firma) through the tube, which is wound around the reel having radius R, there also occurs a centrifugal (apparent) force which may be described by an acceleration $a_c$:

$$a_c = v^2 R^{-1}. \tag{7}$$

This acceleration is orientated outward (i.e., perpendicular to the y axis) and must therefore be quadratically added to a vertical component $a_y$ resulting from the vertical oscillation, to obtain the normal force of the cable on the tube wall. The total normal force $F_n$ is calculated per unit of length (m) at a weight W of a cable segment of unit length. The forces (basically) act in the same manner along the entire length of the cable in the tube (apart from a minor correction, which is required in the event that the tube has been wound in turns around the tube reel in more than one layer). Roughly speaking, the calculations below therefore apply to any cable and tube lengths. In the first half period ("free-fall" movement), the normal force is determined by the centrifugal (apparent) force, so that:

$$F_n = (W/g) \cdot (v^2/R). \tag{8}$$

In the second half period (frictional contact under double gravitational effect with respect to the tube wall), the centrifugal (apparent) force also acts, so that:

$$F_n = [(2W)^2 + \{((W/g) \cdot (v^2/R)\}^2]^{\tfrac{1}{2}}. \tag{9}$$

As a result of the normal force, there will occur a frictional force $F_w$ between cable and tube if these have a relative movement with respect to one another:

$$F_w = f \cdot F_n. \tag{10}$$

Here, f is the frictional coefficient between cable and tube. Although said coefficient may depend on the (relative) velocity, for simplicity's sake it is chosen to be constant. In the event of not-too-great differences in (relative) velocity, this usually is a good approximation. In the second half period, in the event of a relative movement of the cable with respect to the tube, there will obviously be more friction than in the first half period. At the beginning of the "free-fall" movement (at t=0,P), therefore, the cable will certainly have an initial velocity vt. During the "free-fall" movement, the cable will undergo a retardation as a result of the backward movement of the tube and the centrifugal (apparent) force. Said retardation follows from (8) and (10), taking into account that in fact dv/dt is equal to $F_w g/W$:

$$dv/dt = -f \cdot v^2/R. \quad (11)$$

Having $v(t=0)=v_t$ as a prior condition, for the velocity in the first half period there then follows:

$$v = R \cdot v_t (R + f \cdot v_t t)^{-1}. \quad (12)$$

From (12), it follows that the cable velocity never becomes negative during the "free-fall" movement, so that in the first half period there will always be a net forward movement of the cable with respect to the tube. To calculate the velocity curve of the cable in the second half period, there is required a numeric integration with the help of the formulas (9) and (10). A simple "worst-case" approach, however, is that the cable reaches its velocity in the same manner as it is retarded (due to the higher friction, in reality $v_t$ is reached much sooner than according to the "worst-case" approach). In this case, an average velocity vav may be calculated by integrating the velocity v (from (12)) over two first half periods ("free fall") in time, and dividing it by the entire period P. The result is:

$$V_{av} = 2R \cdot (f \cdot P)^{-1} \ln\{1 + (f \cdot v_t P) \cdot (2R)^{-1}\}. \quad (13)$$

From this, it follows that the average velocity $v_{av} = v_t$ for as long as:

$$P << 2R \cdot (f \cdot v_t)^{-1}. \quad (14)$$

Exemplary calculation:

Consider a cable having a weight W per metre of 0.2 N/m and diameter of 4.5 mm, which is inserted into a tube having inner diameter 5.5 mm, which is wound around a reel having radius R of 0.5 m. Note that the cable has little room in the tube. The frictional coefficient f between cable and tube is 0.2. Set the frequency at which the tube reel is brought to periodical movement at 5 Hz, therefore having a period P of 0.2 sec. From (3), there follows an amplitude $A_v$ of 12.5 mm, therefore significantly larger than the inner diameter of the tube. For a feed velocity of 1 m/sec., $v_t$ must be 1 m/sec. This corresponds to an amplitude $A_L$ of 50 mm for the sawtooth-shaped movement of the oscillating rotation, which corresponds to an oscillation angle θ of approximately 6°. The condition for the period according to (14) is easily met, since the average velocity $v_{av}$ calculated with the help of formula (13) is only 2% less than $v_t$. Therefore, the feed velocity for the cable may still be set significantly higher (up to a factor hundred), before the effect of the centrifugal (apparent) force becomes so high that an increase of $v_t$ has only a marginal effect on the average velocity $v_{av}$.

In a practical realization, a combination of an ideal free-fall movement in a vertical direction and a sawtooth-shaped oscillating rotation in a longitudinal direction basically is mechanically viable. It is more simple to choose sinusoidal approximations for both movements, since for sinusoidal movements the driving mechanism is generally more simple. For the same period P and the same vertical and longitudinal amplitudes $A_v$ and $A_L$ (see formulas (3) and (6)), said approximations look as follows:

$$y = A_v \sin(2\pi t/P) \quad (15)$$

and $$s = A_L \cos(2\pi t/P). \quad (16)$$

In FIG. 2, these are shown as the curves sv and sl (dotted lines), respectively. With the help of (15), for the normal force Fn there follows:

$$F_n = W|1 - (\pi^2/8) \cdot \sin(2\pi t/P)|. \quad (17)$$

Figure 3:
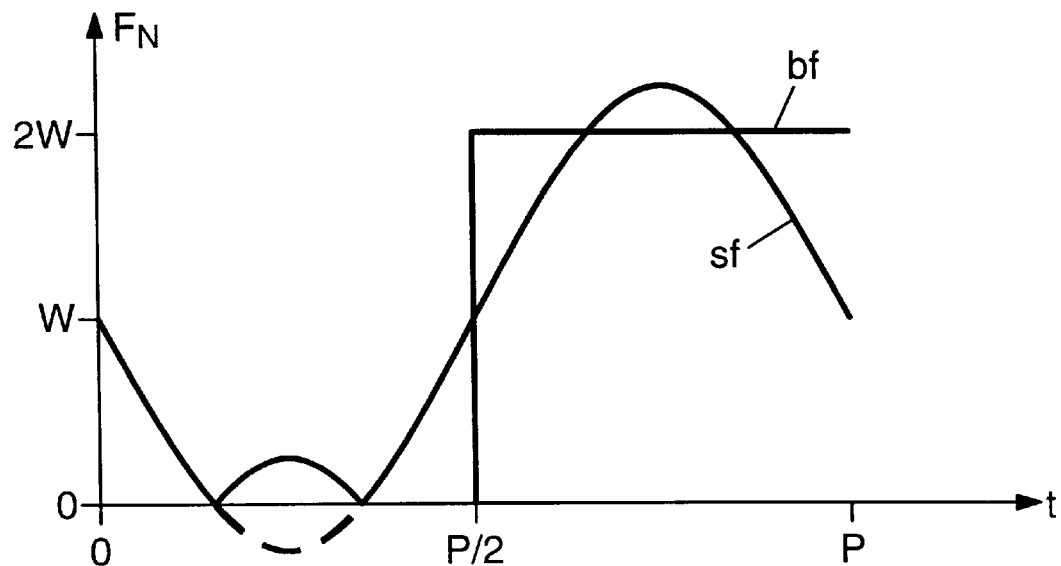
FIG. 3 gives a graphical representation of the curve of normal forces occurring during a periodical movement applied in the embodiment of FIG. 1.

The curve of the normal force $F_n$ according to (17) is shown in FIG. 3 as curve sf. For comparison's sake, there has also been added a block function bf having values 0 and 2W, which shows the normal force according to the formulas (8) and (9), ignoring the centrifugal (apparent) force. In the first half period, the normal force according to the curve sf is not zero but on average it is very low. With the help of the formulas (16) and (6), for the velocity v there is found:

$$v = -v_t \cdot \tfrac{1}{2}\pi \sin(2\pi t/P). \quad (18)$$

Figure 4:
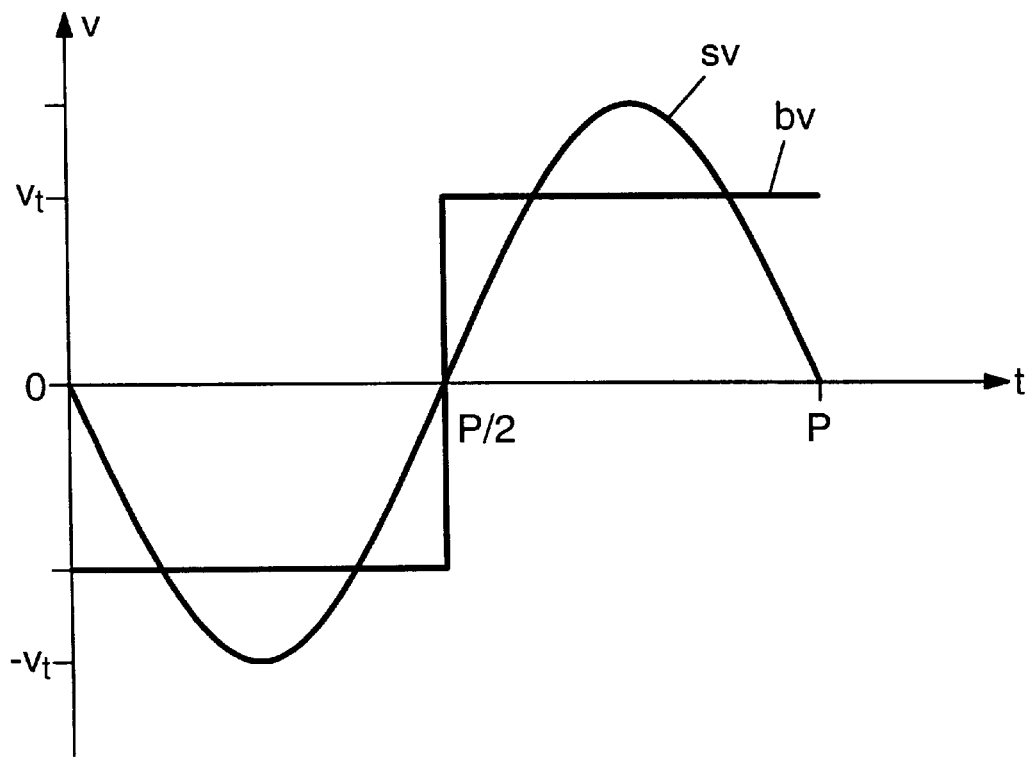
FIG. 4 gives a graphical representation of the curve of velocities occurring during a periodical movement applied in the embodiment of FIG. 1.

The curve of the velocity v according to (18) is shown in FIG. 4 as curve sv, while, for comparison's sake, there is shown a block function by having values $\pm v_t$, which the velocity v has, again ignoring the centrifugal (apparent) force. The figure shows that the velocity, viewed longitudinally in forward (backward) direction, in the second (first) half period is not always equal to $+v_t$ ($-v_t$), but on average it is. In the forward direction, the friction is obviously greater, so that the cable will be given a net forward movement. In general, this will be somewhat smaller than $v_t$. In addition, as already indicated, $v_t$ may still be chosen considerably higher (in the event of a suitable choice of the amplitude $A_L$ and period P according to formula (6)), before the centrifugal (apparent) force begins to have an adverse effect on the feed velocity.

Figure 5:
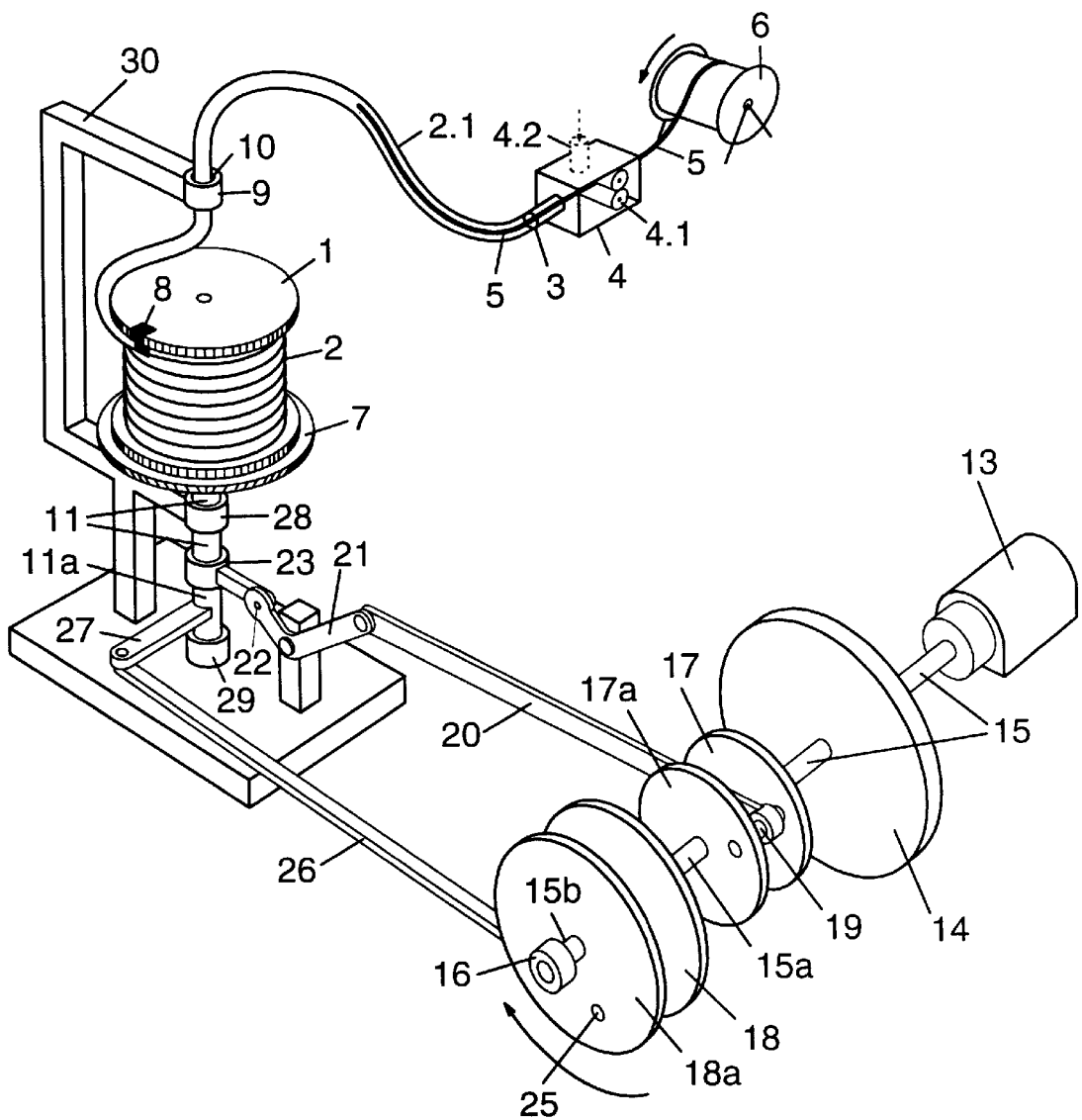
FIG. 5 diagrammatically shows a first device for carrying out the method according to the invention.
Figure 6:
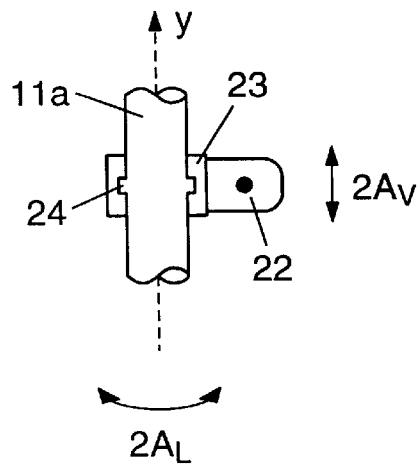
FIG. 6 shows a first detail of the device according to FIG. 5.
Figure 7:
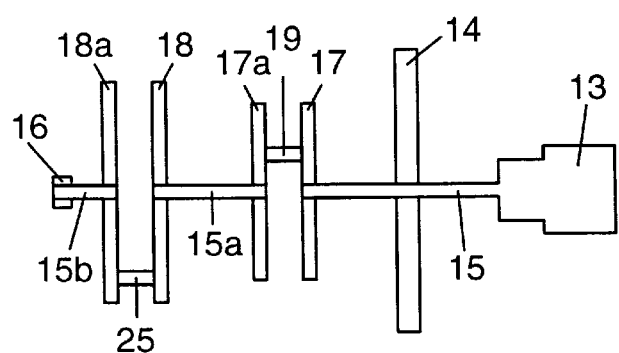
FIG. 7 shows a second detail of the device according to FIG. 5.
Figure 8:
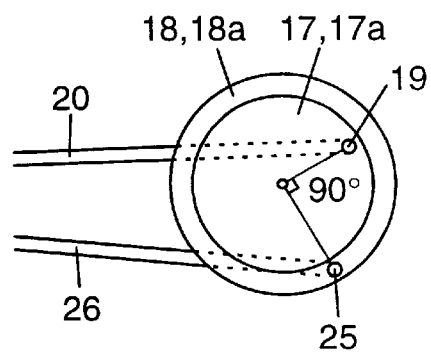
FIG. 8 shows a third detail of the device according to FIG. 5.

With reference to the figures FIGS. 5, 6, 7 and 8, there is described a first device for carrying out the insertion method explained above. For this purpose, FIG. 5 gives an overview of the entire device, while the other figures show several components in more detail. In FIG. 5, several components corresponding to FIG. 1 have the same numbers. A cable 5 is fed from a cable reel 6 by means of a feed unit 4 into a free end 2.1 of a tube 2 on a tube reel 1. The tube 2 is fixed, by way of a clamp 8, onto the tube reel 1. The free end 2.1 of the tube 2 is uncoupled for rotation, with the help of a coupling 3, from a tube part 2.2 of the tube 2, which is coupled to the feed unit 4. In this connection, the free end 2.1 of the tube 2 is guided from the cable reel 6, by way of a tube guide 9 having a cylindrical or eye-shaped passage opening 10, to the feed unit 4. The tube reel 1 is mounted on a carrier 7 which is rigidly coupled to an axle 11.

The vertical and the longitudinal components of the periodical movement of the carrier 7 are generated with the help of a motor 13 and a flywheel 14. These are coupled, by way of axles 15, 15a and 15b, to a first pair of oscillation wheels 17, 17a, and a second pair of oscillation wheels 18, 18a. The axle 15a is inserted into bearing 16, which is supported by terra firma (not shown). The first pair of oscillation wheels 17, 17a drive a connecting rod 20 by way of a joining piece 19. Said connecting rod may impose, by way of a "boomerang-shaped" lever 21 and a mortise and tenon joint 22, a vertical oscillation on a cylinder 23, which is mounted around the axle part 11a of the axle 11. The cylinder 23 transfers, by way of a flanged construction with groove 24 (see FIG. 6) the vertical oscillation to the axle 11, while a free rotation of the axle part 11a, and therewith of the entire axle 11, in the cylinder 23 continues to be possible. The second pair of oscillation wheels 18, 18a drive a connecting rod 26 by way of a joining piece 25, which connecting rod moves a lever 27 horizontally to and fro. The lever 27, which is fixed to the axle part 11a of the axle 11, transfers said to-and-fro movement to the axle 11, as a result of which the axle begins to carry out an oscillating rotation. The axle 11 is rotatably contained by cylinders 28 and 29, in which the axle may also move vertically. The cylinder 28 is mounted, together with the tube guide 9, on a stand 30, which forms terra firma for the axle 11 and the carrier 7 mounted thereon with the tube reel 1. The cylinder 29 is mounted on terra firma below the axle part 11*a*. In the cylinder under the axle part 11*a*, the vertical downward movement may be springily absorbed. By a suitable positioning of the joining piece 19 in the first pair of oscillation wheels 17, 17*a* with respect to the joining piece 25 in the second pair of oscillation wheels 18, 18*a* (see FIG. 8), it is achieved that the vertical oscillation and the oscillating rotation of the carrier 7 are a quarter period out of phase. Readjustment of the phase is possible by turning the two pairs of wheels with respect to one another.

To discontinue braking effects of (stagnant) air in the tube, there may possibly be fed, simultaneously with the insertion of the cable from the feed unit 4, a fluid, such as compressed air, by way of the free end 2.1 to the tube 2 under pressure (e.g., by way of a feed pipe 4.2 of the feed unit 4), or the air may be pumped out at the opposite end of the tube.

Figure 9:
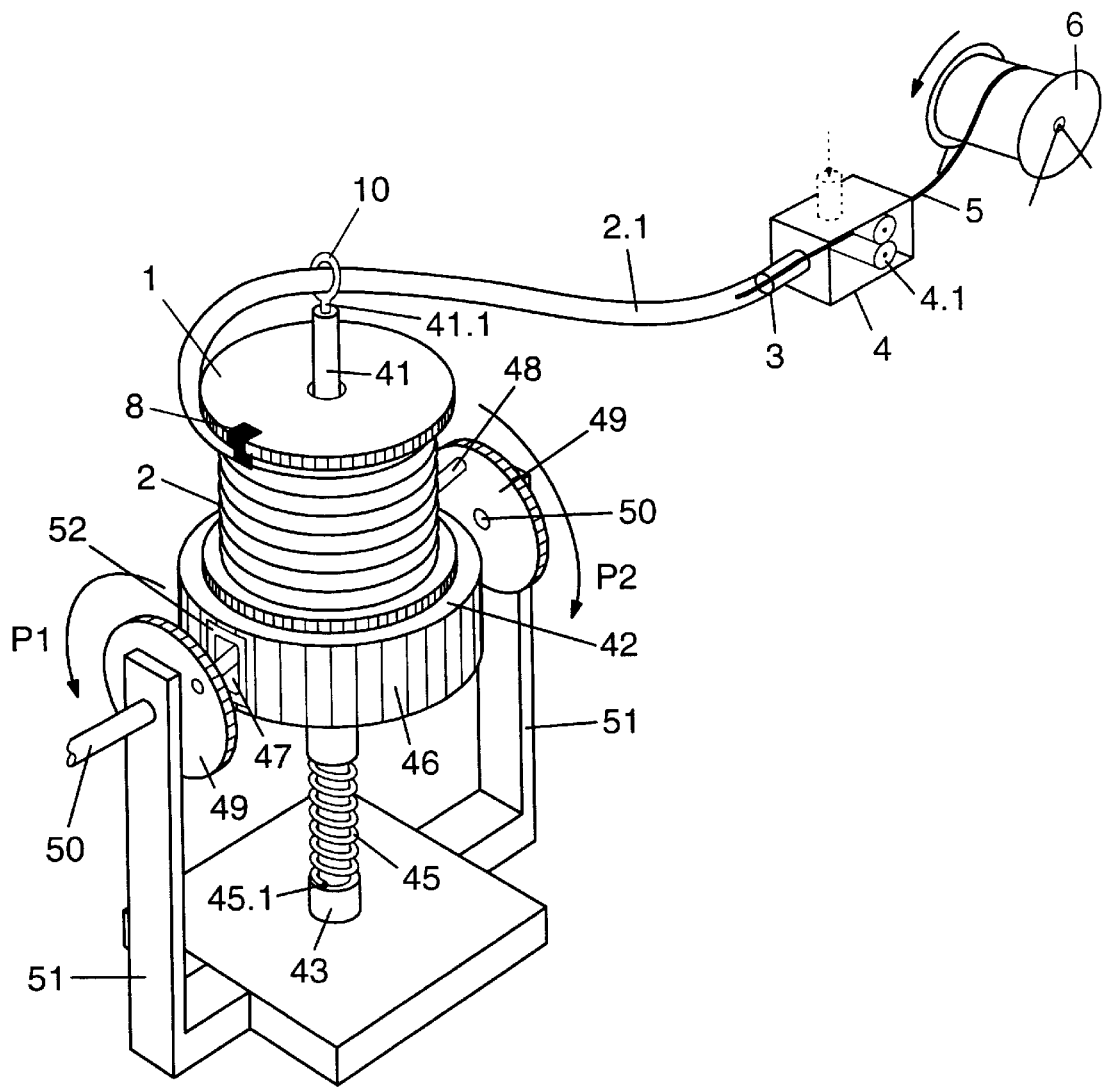
FIG. 9 diagrammatically shows a second device for carrying out the method according to the invention.
Figure 10:
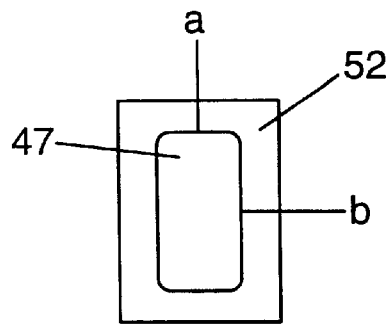
FIG. 10 shows a first detail of the device according to FIG. 9.
Figure 11:
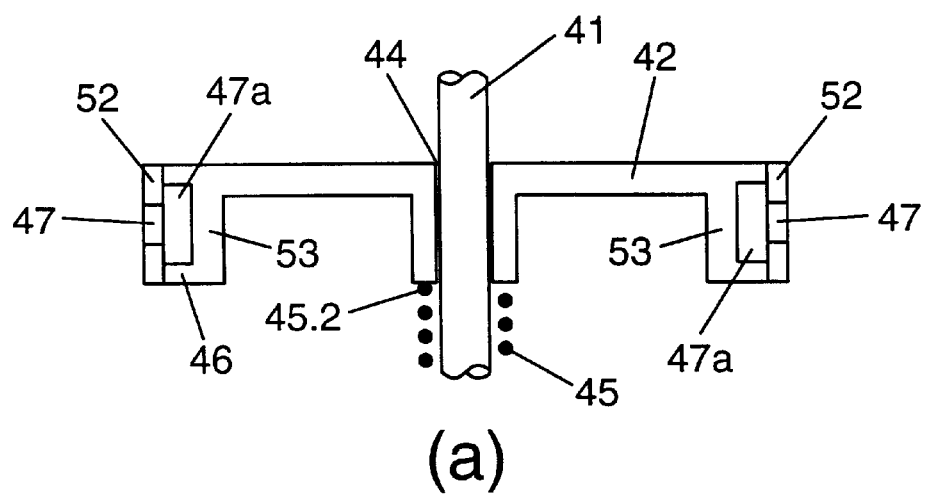
FIG. 11 shows, in components (a) and (b), two variants for a second detail of the device according to FIG. 9.
Figure 11:
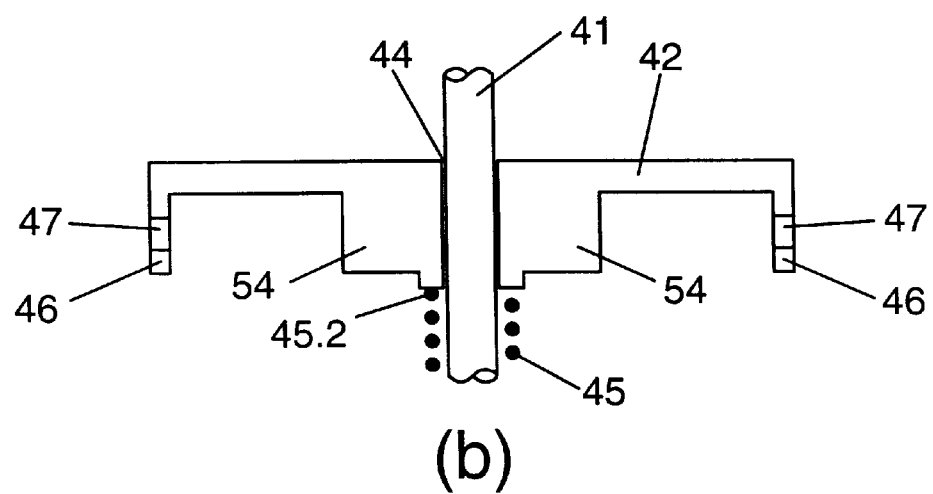

A second device for carrying out the insertion method is described with reference to the figures FIGS. 9, 10 and 11. FIG. 9 diagrammatically shows the device in its entirety, while the two other figures show several components in detail. Several parts corresponding to FIG. 1 again have the same numbers. A tube reel 1 having the tube 2 wound around it is loosely placed over an axle 41 on a platform 42 and fixed thereto (fixing means not shown). The free end 2.1 of the tube 2 is again coupled, by way of a passage opening 10 which is mounted on the end 41.1 of the axle 41, to the feed unit 4. The axle 41 is vertically fixed to a base 43, which is connected to terra firma. The platform 42 is preferably round having a central opening 44, through which the axle 41 protrudes. Around the axle 41, there is placed a coil spring 45, which is fixed by its ends 45.1 and 45.2 to the base 43 and to the underside of the platform 42, respectively, and on which the platform 42 having the tube reel 1 placed thereon rests springily. The coil spring 45 simultaneously permits a vertical springy up-and-down movement and a (springy) to-and-fro twisting movement of the platform around the axle 41. The platform 42 has a vertical edge 46 around it which is provided with two recesses 47 diametrically opposite one another. Into each of the two recesses there is horizontally inserted a rod 48, which is eccentrically mounted on a wheel 49. Each of the wheels 49 is rotatably mounted around a horizontal rotary shaft 50 in a frame part 51 connected to terra firma. The horizontal rotary shafts 50 of the wheels 49 are substantially in line with one another. In operation, the wheels are synchronously driven in mutually opposite directions of rotation (arrows $P_1$ en $P_2$) (driving mechanisms not shown). The wheels are mutually adjusted in such a manner that the rods 48 are always simultaneously in their highest and in their lowest positions. In this connection, the wheels 49 transfer their (circular) movement, by way of the rods 48 and the recesses 47 made in the edge 46, to the platform 42. The circumference of each recess 47 is determined by a plate 52 having the dimensions of the recess 47, which is mounted over a hole 47*a* in the edge 46. The circumference of the recess 47 more or less has the shape of a rectangle having horizontal and vertical sides a and b (with rounded corners for better guidance of the rods; see FIG. 10). Assuming a fixed distance between the rods 48 and the rotary shafts 50 of the wheels 49, by choosing the dimensions of the sides a and b, there may be obtained the desired vertical amplitude $A_v$ and longitudinal amplitude $A_L$. It should be noted here that, due to such a shape of the recesses, the rods 48 no longer drive the platform 42 exactly sinusoidally in the vertical and longitudinal directions. By choosing, for a given total mass M of the platform 42, the tube reel 1 and the tube 2 wound around it, a suitable spring constant k for the coil spring 45, it may be achieved that the movements are still substantially sinusoidal. The spring constant k (i.e., the ratio between the force on, and the deflection of, the spring) is chosen in such a manner that, at the given total mass M and a certain vertical amplitude $A_v$, the vertical periodical movement for a non-negligible part of the period is, as far as possible, a "free-fall" movement. This is achieved under the following conditons: If the platform 42 (i.e., the rods 48) is in the highest/middle/lowest vertical position, the force on coil spring 45 must be 0/Mg/2 Mg, respectively. Here, g again is the gravitational constant. For the spring constant k, it follows that:

$$k = Mg/A_v. \qquad (19)$$

If these conditions are met, the mass-spring system will show a natural oscillation in vertical direction, of which a non-negligible part approximates the "free-fall" movement. The wheels 49 need only supply a small force, by way of the rods 48, to keep the oscillation going. After all, the great forces required for the accelerations during the vertical oscillation of the mass M are supplied by the coil spring. In addition, it is basically unnecessary to set the revolution time of the wheels (according to equation (3)), but it is desirable and easy to do so; and a "small push" against the wheels when passing a certain point is already sufficient.

The oscillating rotation, i.e., the longitudinal periodical movement, keeps pace, albeit with a phase difference of a quarter period, with the vertical oscillation and is achieved by the same wheels 49. That is why basically there still should be exercised relatively great forces by the wheels 49, by way of the rods 48, on the platform 42. A coil spring, however, may also offer a resistance to torsion. How great said resistance to torsion is in proportion to the resistance to compression, depends on the construction of the coil spring. Basically, it is possible to construct the coil spring in such a manner that the same spring also has a torsional constant, which may provide a natural oscillation in longitudinal direction having amplitude $A_L$ and the same period. For this purpose, the torsional constant must satisfy a similar equation as (19) having, instead of the amplitude $A_v$ and the mass M, the amplitude $A_L$ and the mass moment of inertia of the platform and the tube reel bearing the tube. Instead of a singular springy member, such as the coil spring 45, there may also be applied a composite springy member to achieve the correct ratio between the spring constant and the torsional constant. An optimisation of the device may also be obtained by suitably choosing the ratio between the mass M and the moment of inertia. This may be achieved, e.g., by shifting mass in the platform 42 outwards, e.g., by applying weighting materials 53 in the edge 46 (see component (a) of FIG. 11); or by conversely shifting mass inward, e.g., by way of weighting materials 54 around the central opening 44 of the platform 42 (see component (b) of FIG. 11).

Basically, one driven wheel 49 having rod 48 may suffice if, for the periodical movement, the axle 41 is capable of gliding close-fittingly, without tilting, through the hole 44 of the platform 42. For stabilisation of the platform movement, in this connection the second wheel may be constructed as a flywheel.

In the event of possible stagnation during the insertion of the cable into the tube, the rotating oscillation may be stopped by halting the wheels 49 at maximum longitudinal deflection. The vertical oscillation may simply "decay" in the event of sufficient free room in the recess 47 (length of the side b of the rectangular plate 52).

In the above embodiments, described with reference to figures FIGS. 5–11, driving mechanisms are used, which convert a circular movement into the desired periodical vertical and longitudinal movements. However, also driving mechanisms are possible, which convert separate linear movements, such as generated by hydraulic drives, into the desired periodical movements. E.g. in the device of FIG. 5 both the "boomerang-shaped" lever 21 and the lever 27 may each be pivotally connected to an end of a piston rod of a different hydraulic drive, of which the cylindric part is connected to terra firma. In that the operation of the two hydraulic drives should be synchronized with respect to period and phase difference.

Figure 12:
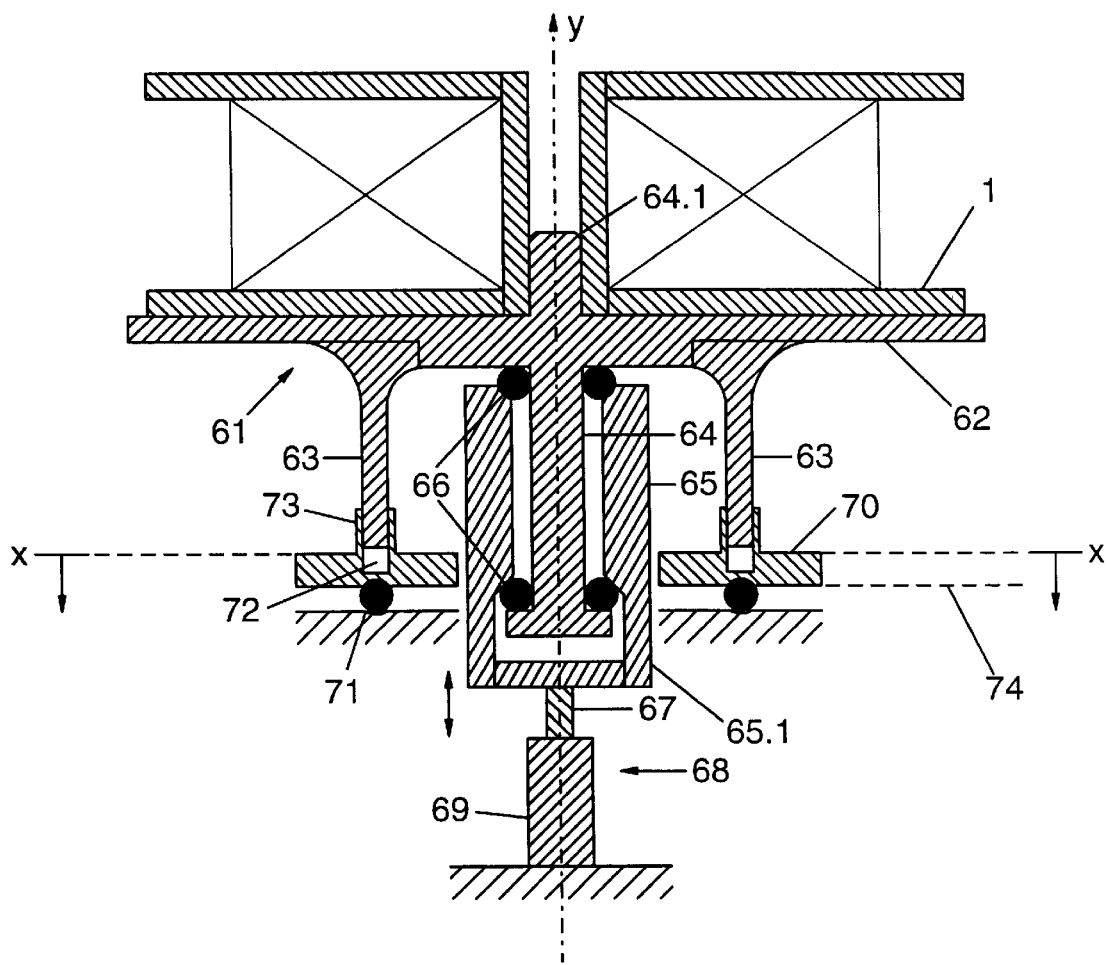
FIG. 12 shows in a cross-sectional view a third device for carrying out the method according to the invention.
Figure 13:
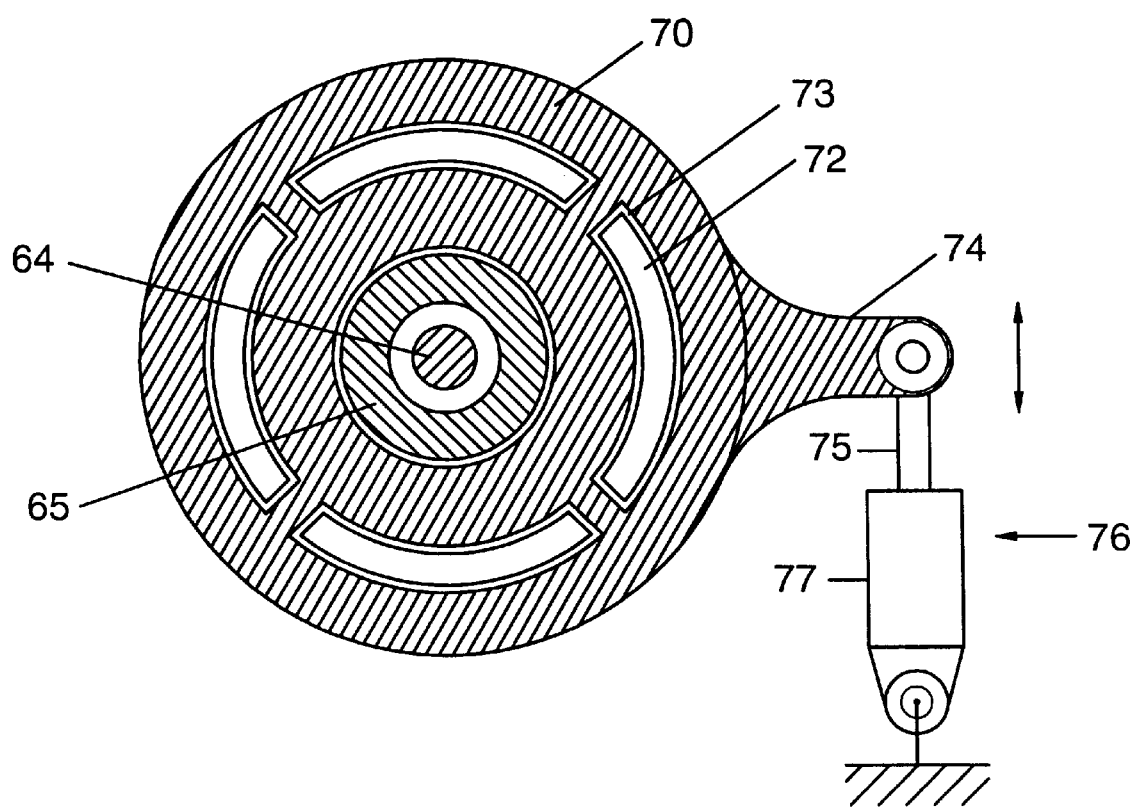
FIG. 13 shows another cross-section of the third device in a view indicated by X—X in FIG. 12.

With reference to the figures FIG. 12 and 13, there is described a third device for carrying out the insertion method, in which device hydraulic drives are applied for generating the desired movements. FIG. 12 shows a cross-sectional view of the device according to a vertical plane through the central axis (y axis), whereas FIG. 13 shows a cross-section of the device perpendicularly to the central axis in a view indicated by X—X in FIG. 12. The device comprises a table 61 with a mainly circular tabletop 62 and table-legs 63. A vertical shaft 64 is fixedly mounted in the centre of the tabletop. An upper part 64.1 of the vertical shaft 64 centres the tube reel 1 placed on the tabletop. The vertical shaft 64 is rotatably mounted in a cylinder 65, coaxially with the central axis. The vertical shaft 64 is running in two sets of bearings 66 such that it is vertically fixed with respect to the cylinder 65. The lower part 65.1 of the vertical cylinder is fixedly connected to a piston rod 67 of a first hydraulic drive 68, the cylinder part 69 of which is in a fixed vertical position with respect to terra firma. A ring-like disk 70 is rotatably mounted around the vertical cylinder 65, but in a vertically fixed position to terra firma, by means of bearings 71. The disk 70 is provided with savings 72 for receiving the legs 63 of the table 61. The savings 72 are surrounded by vertical guides 73, in such a way that the table 61, having its legs 63 in the savings 72, is movable only in a vertical direction with respect to the disk 70. The disk is provided with an extension arm 74, which is pivotally connected to a piston rod 75 of a second hydraulic drive 76, the cylinder part 77 of which is pivotally connected to terra firma (indicated only symbolically in the figure). When driven by the hydraulic drive 76 (via the piston rod 75 and the extension arm 74) the disk is forced to a to-and-fro rotating movement around the central axis (y axis), taking along the table 61 in this rotating movement. Simultaneously driven by the first hydraulic drive 68 (via the piston rod 67 and the cylinder 65) the table 61 is forced to an up-and-down movement. Also in this case the operation of the two hydraulic drives 68 and 76 should be synchronized with respect to period and phase difference in order to realise the desired "free-fall" movement during each period.

What is claimed is:

1. A method for inserting a cable-shaped member into an elongated tube-shaped member coiled around a holder having a substantially vertical axis of symmetry, the method comprising:

inserting an initial end and following parts of a length of the cable-shaped member into a free end of the tube-shaped member, and subjecting the holder to a periodical movement having a vertical component and a longitudinal component aligned with a longitudinal direction of the coiled tube-shaped member, wherein the vertical component of the periodical movement comprises, a vertical oscillation including a substantially free fall movement during a substantial part of each period, and the longitudinal component comprises an oscillating rotation around the vertical axis of symmetry of the holder, the vertical oscillation and the oscillating rotation being substantially a quarter period out of chase such that the free fall movement part of the vertical oscillation commences when a rotational direction of the oscillating rotation is reversed and becomes opposite to a direction of insertion of the cable-shaped member.

2. The method according to claim 1, wherein the free fall movement part of the vertical oscillation lasts approximately half of each period.

3. The method according to claim 2, wherein both the vertical oscillation and the oscillating rotation are approximately sinusoidal.

4. The method according to claim 1, wherein both the vertical oscillation and the oscillating rotation are approximately sinusoidal.

5. The method according to claim 1, wherein the tube-shaped member is evacuated at an open end thereof opposite the free end thereof.

6. The method according to claim 1, wherein compressed air is fed into the free end of the tube-shaped member.

7. The method according to claim 1, wherein the free end of the tube-shaped member is guided by a guide from the holder to a cable feed unit, the guide being located in a fixed position with respect to terra firma substantially on the vertical axis of symmetry of the holder.

8. A device for inserting a cable-shaped member into an elongated tube-shaped member coiled around a holder having turns around a substantially common axis of symmetry, the device comprising:

a carrier on which the holder is mountable at a position such that said axis of symmetry substantially vertical, driving means for engaging the carrier to subject the carrier to a periodical movement having a vertical and a longitudinal component, and supporting means for supporting the carrier so that the carrier is rotatably and vertically displaceable around said substantially vertical axis, wherein the driving means includes at least one driving mechanism for generating said periodical movement of the carrier, and wherein the vertical component of said periodical movement comprises a vertical oscillation having a period and an amplitude for achieving a substantially free fall movement during a substantial part of each period, and the longitudinal component of the periodical movement comprises an oscillating rotation around the vertical axis of symmetry, the vertical oscillation and the oscillating rotation being substantially a quarter period out of phase.

9. The device according to claim 8, wherein the at least one driving mechanism converts a circular movement into said periodical movement of the carrier.

10. The device according to claim 9, wherein the carrier comprises a horizontal platform, and the supporting means includes a springy member mounted approximately centrally under the platform, said springy member being vertically compressible and twistable around a vertical axis of the springy member.

11. A device for inserting a cable-shaped member into an elongated tube-shaped member coiled around a holder having turns around a substantially common axis of symmetry, the device comprising:

a carrier on which the holder is mountable at a position such that said axis of symmetry is substantially vertical, driving means for engaging the carrier to subject the carrier to a periodical movement having a vertical and a longitudinal component, and supporting means for supporting the carrier so that the carrier is rotatable and vertically displaceable around said substantially vertical axis, wherein the vertical component of said periodical movement comprises a vertical oscillation having a period and an amplitude for achieving a substantially free fall movement during part of each period, and the longitudinal component of the periodical movement comprises an oscillating rotation around the vertical axis of symmetry, wherein the supporting means includes a vertical rotary shaft which is rigidly connected to the carrier, and the driving means includeincludes two driving mechanisms, a first of the two driving mechanisms engaging with the vertical rotary shaft for periodically vertically moving the vertical rotary shaft up and down for generating the vertical oscillation, and the second of the two driving mechanisms engaging with the vertical rotary shaft for periodically rotating the vertical rotary shaft to and fro for generating the oscillating rotation.

12. The device according to claim 11, wherein the first driving mechanism engages with the rotary shaft by means of a flanged construction with a groove.

13. The device according to claim 11 or 12, wherein the second driving mechanism engages with the rotary shaft by means of a lever which is fixedly connected to the rotary shaft.

14. The device according to claim 13, wherein the first and the second driving mechanisms convert a circular movement into said periodical movement of the carrier.

15. The device according to claim 14, wherein the two driving mechanisms are driven by a common drive shaft, and the vertical oscillation and oscillating rotation of said periodical movement of the carrier are a quarter period out of phase.

16. The device according to claim 11 or 12, wherein the first and the second driving mechanisms convert a circular movement into said periodical movement of the carrier.

17. The device according to claim 16, wherein the two driving mechanisms are driven by a common drive shaft, and the vertical oscillation and oscillating rotation of said periodical movement of the carrier are a quarter period out of phase.

18. The device according to claim 11, wherein the first driving mechanism includes a hydraulic drive provided with a piston rod part and a cylinder part, a first part of the piston rod and cylinder parts being fixedly mounted to terra firma, and a second part being coaxially rotatably mounted on a lower end of the rotary shaft.

19. The device according to claim 11 or 18, wherein the second driving mechanism includes a hydraulic drive provided with a piston rod part and a cylinder part, a first part of the piston rod and cylinder parts being pivotally mounted to terra firma, and a second part engaging with the rotary shaft by means of a lever which is coupled to the rotary shaft, in such a way that the lever is fixedly connected to the rotary shaft on behalf of the oscillating rotation and is disconnected to the rotary shaft with respect to the vertical oscillation.

20. A device for inserting a cable-shaped member into an elongated tube-shaped member coiled around a holder having turns around a substantially common axis of symmetry, the device comprising:

a carrier on which the holder is mountable at a position such that said axis of symmetry is substantially vertical, driving means for engaging the carrier to subject the carrier to a periodical movement having a vertical and a longitudinal component, and supporting means for supporting the carrier so that the carrier is rotatably and vertically displaceable around said substantially vertical axis, wherein the driving means includes at least one driving mechanism for generating said periodical movement of the carrier, wherein the vertical component of said periodical movement comprises a vertical oscillation having a period and an amplitude for achieving a substantially free fall movement during part of each period, and the longitudinal component of the periodical movement comprises an oscillating rotation around the vertical axis of symmetry, wherein the at least one driving mechanism converts a circular movement into said periodical movement of the carrier, wherein the carrier comprises a horizontal platform, and the supporting means includes a springy member mounted approximately centrally under the platform, said springy member being vertically compressible and twistable around a vertical axis of the springy member, and wherein the at least one driving mechanism includes a first driving mechanism comprising a wheel rotatably driven around a horizontal axis, said wheel being eccentrically coupled by means of a mortise and tenon construction to an edge of the platform such that the horizontal axis of the wheel and the vertical axis of the springy member lie substantially in one plane.

21. The device according to claim 20, wherein the at least one driving mechanism includes a second driving mechanism having a same construction as the first driving mechanism, said second driving mechanism engaging with the edge of the platform at a position diametrically opposite to the first driving mechanism.

22. The device according to claim 20 or 21, wherein the mortise and tenon construction comprises a substantially rectangular hole having vertical and horizontal sides whose lengths are tuned to a desired amplitude ratio of the vertical and the longitudinal component of the periodical movement.

23. The device according to claim 22, wherein the springy member has a spring constant which is tuned to the period and amplitude of the vertical oscillation.

24. The device according to claim 22, wherein the springy member has a torsional constant which is tuned to a natural rotating oscillation having a same period as the period of the vertical oscillation.

25. The device according to claim 22, wherein the device further comprises a guide, mounted above the holder at a fixed position with respect to terra firma and substantially on the vertical axis of symmetry, for guiding a free end of the tube-shaped member to a cable feed unit.

26. The device according to any one of claims 10, 20 or 21, wherein the springy member has a spring constant which is tuned to the period and amplitude of the vertical oscillation.

27. The device according to any one of claims 10, 20 or 21, wherein the springy member has a torsional constant which is tuned to a natural rotating oscillation having a same period as the period of the vertical oscillation.

28. The device according to any one of claims 10, 20 or 21, wherein the device further comprises a guide, mounted above the holder at a fixed position with respect to terra firma and substantially on the vertical axis of symmetry, for guiding a free end of the tube-shaped member to a cable feed unit.

* * * * *

UNITED STATES PATENT AND TRADEMARK OFFICE
CERTIFICATE OF CORRECTION

PATENT NO. : 5,946,788
DATED : September 7, 1999
INVENTOR(S) : Willem Griffioen et al.

It is certified that error appears in the above-identified patent and that said Letters Patent is hereby corrected as shown below:

Column 2,
Line 64, after "of", delete ",",
Line 65, after "invention" insert -- , a --;

Column 3,
Delete lines 1 and 2;

Column 12,
Line 39, after "symmetry" insert -- is --.

Signed and Sealed this

Nineteenth Day of March, 2002

Attest:

JAMES E. ROGAN
Attesting Officer     Director of the United States Patent and Trademark Office